United States Patent
Miyazaki et al.

(10) Patent No.: US 11,056,984 B2
(45) Date of Patent: Jul. 6, 2021

(54) INVERTER CONTROL DEVICE

(71) Applicant: AISIN AW CO., LTD., Anjo (JP)

(72) Inventors: Masashi Miyazaki, Anjo (JP); Subrata Saha, Anjo (JP); Isao Fujiwara, Nagoya (JP); Yuki Sugiyama, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 20 days.

(21) Appl. No.: 16/637,987

(22) PCT Filed: Sep. 28, 2018

(86) PCT No.: PCT/JP2018/036420
§ 371 (c)(1),
(2) Date: Feb. 10, 2020

(87) PCT Pub. No.: WO2019/066021
PCT Pub. Date: Apr. 4, 2019

(65) Prior Publication Data
US 2020/0220479 A1    Jul. 9, 2020

(30) Foreign Application Priority Data
Sep. 29, 2017  (JP) .............................. JP2017-190602

(51) Int. Cl.
*H02M 7/00* (2006.01)
*H02P 27/08* (2006.01)
(Continued)

(52) U.S. Cl.
CPC ......... *H02M 7/53871* (2013.01); *B60L 53/22* (2019.02); *H02M 1/32* (2013.01);
(Continued)

(58) Field of Classification Search
CPC ....................................................... B60L 3/04
(Continued)

(56) References Cited

U.S. PATENT DOCUMENTS 3,958,166 A * 5/1976 Bailey ....................... H02P 3/18
318/687
4,567,555 A * 1/1986 Matsuse ................ H02M 7/757
318/762

(Continued)

FOREIGN PATENT DOCUMENTS

JP    2015-211533 A    11/2015
WO    2017/098555 A1    6/2017

OTHER PUBLICATIONS

Dec. 25, 2018 International Search Report issued in International Patent Application No. PCT/JP2018/036420.

*Primary Examiner* — Bentsu Ro
(74) *Attorney, Agent, or Firm* — Oliff PLC

(57) ABSTRACT

An inverter control device that controls an inverter connected to a direct-current power supply and connected to an alternating-current rotating electrical machine to convert electric power between direct current and alternating current of a plurality of phases, the inverter control device including an electronic control unit that is configured to perform, in a state in which one switching element of a plurality of switching elements included in the inverter has a turn-off failure in which the switching element always goes into an off state, torque reduction control for reducing torque of the rotating electrical machine or deceleration control for outputting torque in a reverse direction from a rotation direction of the rotating electrical machine by performing switching control of the plurality of switching elements.

20 Claims, 8 Drawing Sheets

(51) Int. Cl.
  *H02M 7/5387*   (2007.01)
  *H02P 29/024*   (2016.01)
  *B60L 53/22*    (2019.01)
  *H02M 1/32*     (2007.01)
  *H02M 1/00*     (2006.01)

(52) U.S. Cl.
  CPC .......... *H02P 27/08* (2013.01); *H02P 29/0241* (2016.02); *H02M 2001/0009* (2013.01)

(58) Field of Classification Search
  USPC ....................................................... 318/560
  See application file for complete search history.

(56)         References Cited

U.S. PATENT DOCUMENTS

| 4,580,205 | A | * | 4/1986 | Matsuse | .............. | H02M 5/4505 |
|---|---|---|---|---|---|---|
|   |   |   |   |   |   | 363/137 |
| 4,918,562 | A | * | 4/1990 | Pulizzi | .................. | H02H 3/207 |
|   |   |   |   |   |   | 340/663 |
| 2020/0244201 | A1 | | 7/2020 | Nishijima et al. | | |

* cited by examiner

Fig.6
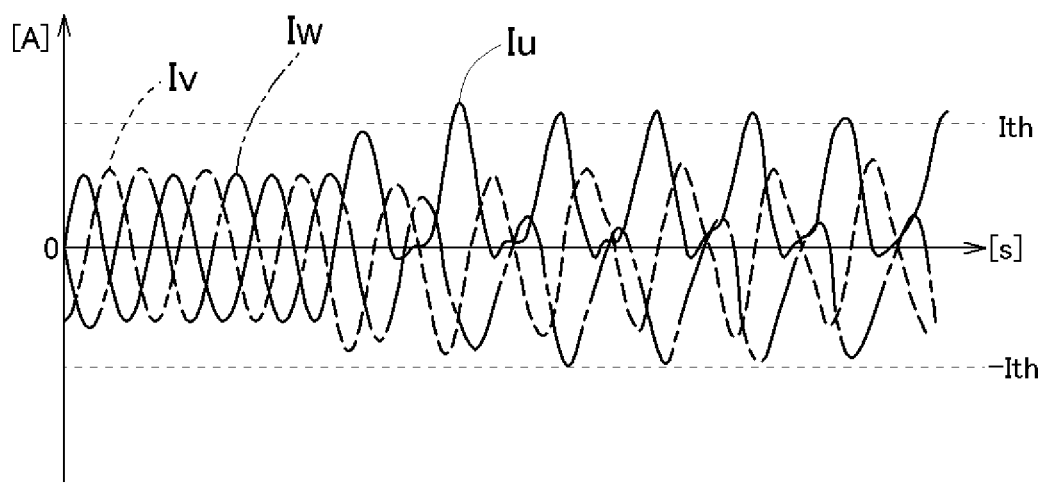
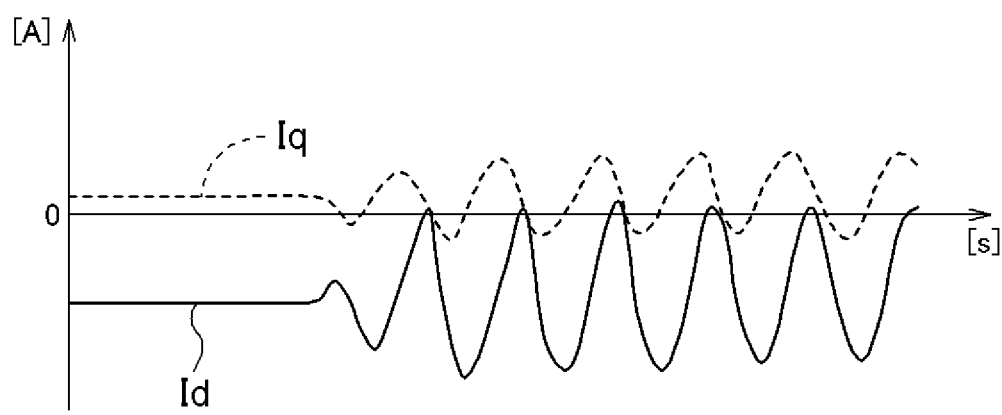
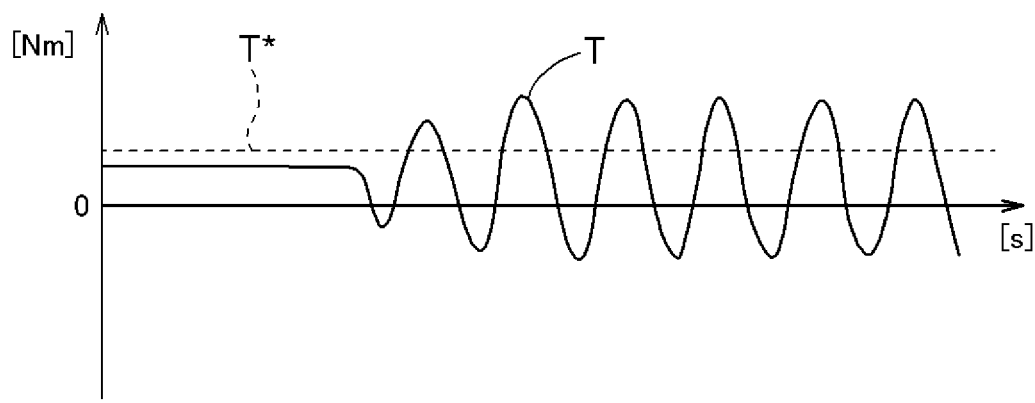

Fig.7
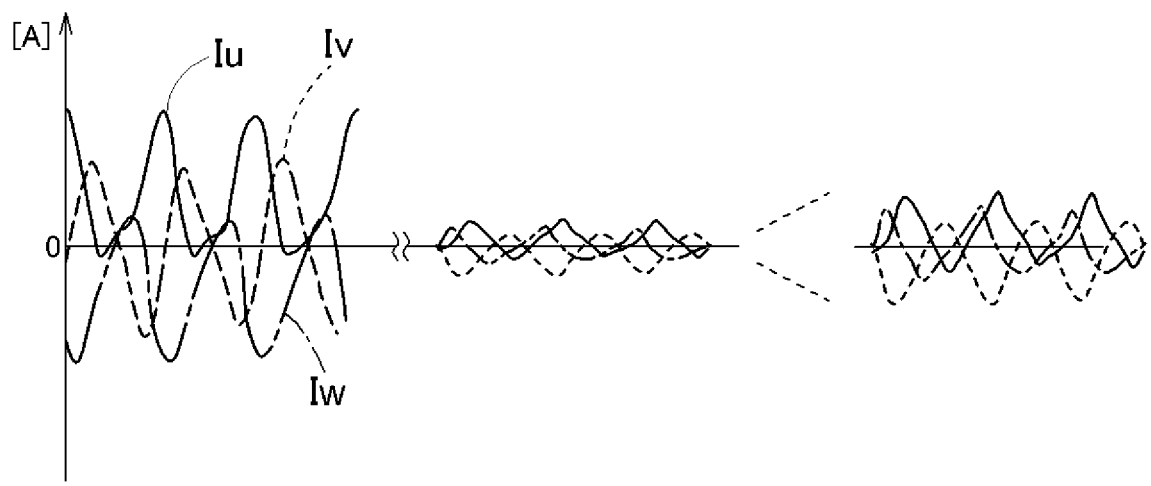
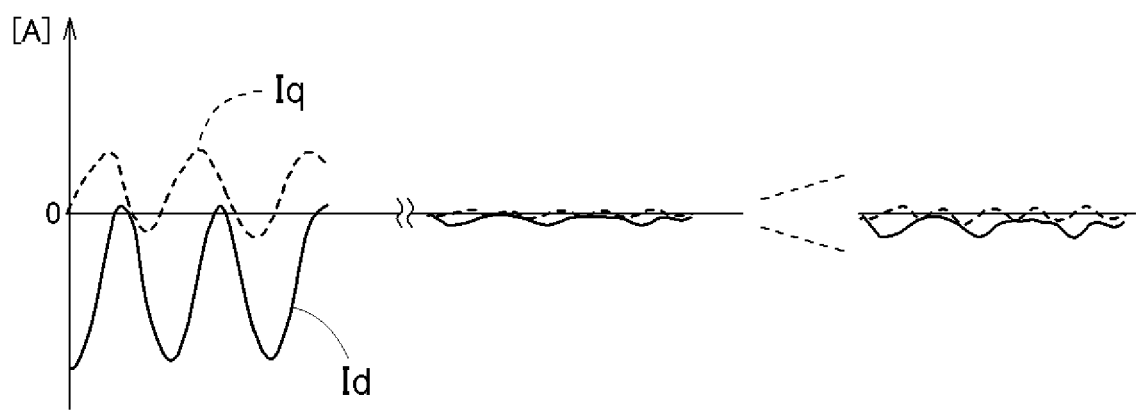
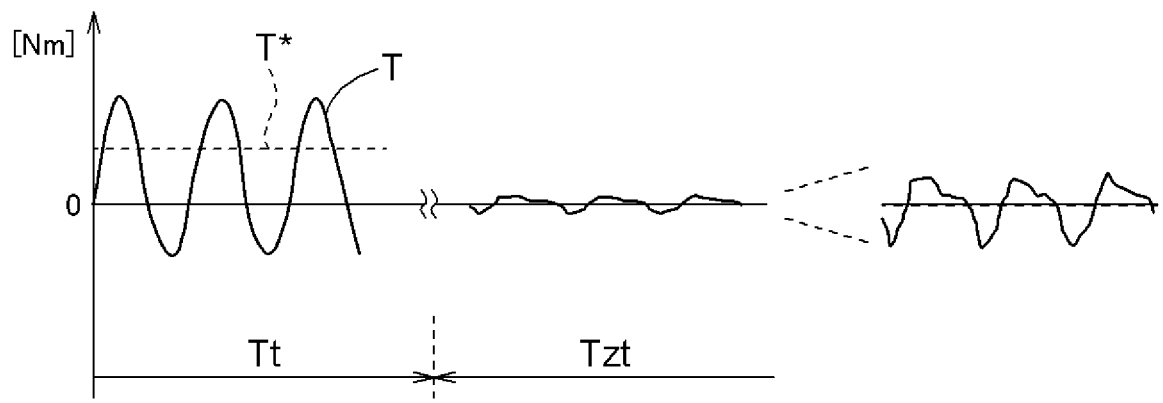

INVERTER CONTROL DEVICE

BACKGROUND

The present disclosure relates to an inverter control device that controls an inverter.

When an abnormality has occurred in an inverter or a rotating electrical machine, various types of fail-safe control are performed. JP 2008-220045 A discloses that, for example, when a short circuit in an inverter has been detected, it is determined on which side of switching elements, an inverter's direct-current positive-polarity side or direct-current negative-polarity side, is in a short-circuit state (i.e., has a turn-on failure), and active short-circuit control for allowing current to flow back between the inverter and a rotating electrical machine is performed on the side on which the short-circuit failure has occurred. For example, in an inverter that converts electric power between three-phase alternating current and direct current, when a short circuit has occurred on a positive-polarity side, upper-stage-side active short-circuit control for bringing upper-stage-side switching elements for all three phases into an on state and bringing lower-stage-side switching elements for all three phases into an off state is performed. When a short circuit has occurred on a negative-polarity side, upper-stage-side active short-circuit control for bringing the lower-stage-side switching elements for all three phases into an on state and bringing the upper-stage-side switching elements for all three phases into an off state is performed.

However, the above-described publication does not disclose fail-safe control performed when a turn-off failure in which a switching element is always fixed in an off state has occurred. For example, when a turn-off failure has occurred in one of switching elements to be controlled to an on state upon performing active short-circuit control, currents flowing through the respective phases lose balance, and there is a possibility that excessive current flows through sound switching elements having no failure, generating heat.

SUMMARY

An exemplary aspect of the disclosure provides a technique for appropriately performing fail-safe control even if one of switching elements of an inverter has a turn-off failure.

In one aspect, an inverter control device in view of the above description is an inverter control device that controls an inverter connected to a direct-current power supply and connected to an alternating-current rotating electrical machine to convert electric power between direct current and alternating current of a plurality of phases, the inverter control device including an electronic control unit that is configured to perform, in a state in which one switching element of a plurality of switching elements included in the inverter has a turn-off failure in which the switching element always goes into an off state, torque reduction control for reducing torque of the rotating electrical machine or deceleration control for outputting torque in a reverse direction from a rotation direction of the rotating electrical machine by performing switching control of the plurality of switching elements.

According to this configuration, current flowing through the inverter can be controlled by torque reduction control or deceleration control, and thus, it becomes easier to transition to shutdown control later. Namely, according to this configuration, even if one of the switching elements of the inverter has a turn-off failure, fail-safe control can be appropriately performed.

Further features and advantages of the inverter control device will become more apparent from the following description of an embodiment which will be described with reference to drawings.

BRIEF DESCRIPTION OF THE DRAWINGS

FIG. 6 is a waveform diagram showing an example of currents and torque obtained upon normal control in a turn-off failure state.

FIG. 7 is a waveform diagram showing an example of currents and torque obtained upon zero-torque control in a turn-off failure state.

DETAILED DESCRIPTION OF EMBODIMENTS

Figure 1:
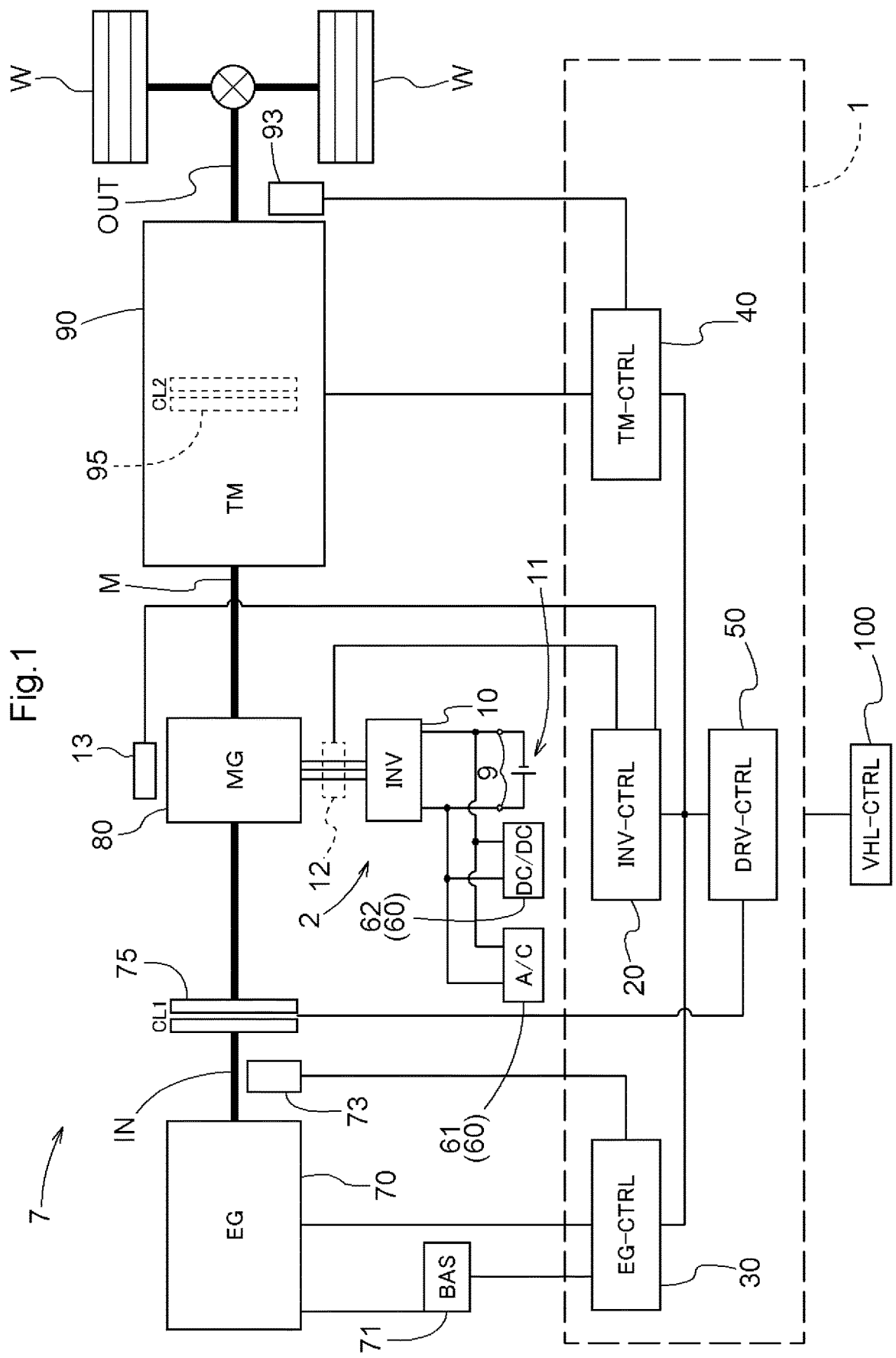
FIG. 1 is a schematic block diagram of a vehicle drive device and a vehicle drive control device.

An embodiment of an inverter control device will be described below based on the drawings. A mode in which a rotating electrical machine serves as a drive power source for wheels on a vehicle is exemplified below. A schematic block diagram of FIG. 1 shows a vehicle drive control device 1 and a vehicle drive device 7 to be controlled by the vehicle drive control device 1. As shown in FIG. 1, the vehicle drive device 7 includes a drive power source engagement device (CL1) 75, a rotating electrical machine (MG) 80, and a transmission device (TM) 90 in this order from an input member IN side in a mechanical power transmission path connecting an input member IN which is drive-coupled to an internal combustion engine (EG) 70 serving as a drive power source for the vehicle to an output member OUT which is drive-coupled to wheels W.

Note that the term "drive-coupled" used herein refers to a state in which two rotating elements are coupled together such that drive power can be transmitted. Specifically, the term "drive-coupled" includes a state in which the two rotating elements are coupled together such that they rotate together, or a state in which the two rotating elements are coupled together through one or two or more power transmission members such that drive power can be transmitted. Such power transmission members include various types of members that transmit rotation at the same speed or at a changed speed and include, for example, shafts, gear mechanisms, belts, and chains. In addition, such power transmission members may include engagement devices that selectively transmit rotation and drive power, e.g., a friction engagement device and a mesh engagement device.

The vehicle drive control device 1 controls each part of the above-described vehicle drive device 7. In the present embodiment, the vehicle drive control device 1 includes an inverter control device (INV-CTRL) 20 which serves as the core to control the rotating electrical machine 80 through an inverter (INV) 10 which will be described later; an internal combustion engine control device (EG-CTRL) 30 which serves as the core to control the internal combustion engine 70; a transmission device control device (TM-CTRL) 40 which serves as the core to control the transmission device 90; and a travel control device (DRV-CTRL) 50 that performs overall control of those control devices (20, 30, and 40). In addition, the vehicle also includes a vehicle control device (VHL-CTRL) 100 which is a higher-level control device of the vehicle drive control device 1 and controls the entire vehicle.

As shown in FIG. 1, the vehicle drive device 7 is a so-called parallel hybrid drive device including the internal combustion engine 70 and the rotating electrical machine 80 as drive power sources for the vehicle. The internal combustion engine 70 is a heat engine driven by fuel combustion, and for example, a gasoline engine or a diesel engine can be used. The internal combustion engine 70 is drive-coupled to the rotating electrical machine 80 through the first engagement device 75, and switching can be performed between a state in which drive power is transmitted between the internal combustion engine 70 and the rotating electrical machine 80 and a state in which drive power is not transmitted between the internal combustion engine 70 and the rotating electrical machine 80, according to the state of the first engagement device 75.

When the first engagement device 75 is engaged, the internal combustion engine 70 can start by rotation of the rotating electrical machine 80. That is, the internal combustion engine 70 can start, following the rotating electrical machine 80. On the other hand, the internal combustion engine 70 can also start independently of the rotating electrical machine 80. When the first engagement device 75 is in a disengaged state, the internal combustion engine 70 starts by a starter 71. In the present embodiment, as the starter 71, a belted alternator starter (BAS) suitable for so-called hot start such as a restart from no idling is exemplified.

The transmission device 90 is a stepped automatic transmission device having a plurality of shift speeds with different gear ratios. For example, the transmission device 90 includes a gear mechanism such as a planetary gear mechanism and a plurality of engagement devices (a clutch, a brake, etc.) to form a plurality of shift speeds. An input shaft of the transmission device 90 is drive-coupled to an output shaft (e.g., a rotor shaft) of the rotating electrical machine 80. Here, a member to which the input shaft of the transmission device 90 and the output shaft of the rotating electrical machine 80 are drive-coupled is referred to as an intermediate member M. The rotational speed and torque of the internal combustion engine 70 and the rotating electrical machine 80 are transmitted to the input shaft of the transmission device 90.

The transmission device 90 changes the rotational speed transmitted to the transmission device 90, at a gear ratio of each shift speed, and converts the torque transmitted to the transmission device 90 and transmits the converted torque to an output shaft of the transmission device 90. The output shaft of the transmission device 90 is split into two axles through, for example, a differential gear (output differential gear device), and the torque is transmitted to the wheels W which are drive-coupled to the respective axles. Here, the gear ratio is the ratio of the rotational speed of the input shaft to the rotational speed of the output shaft (=the rotational speed of the input shaft/the rotational speed of the output shaft) for when each shift speed is formed in the transmission device 90. In addition, torque obtained by multiplying torque transmitted to the transmission device 90 from the input shaft by a gear ratio corresponds to torque transmitted to the output shaft.

Note that although here a mode is exemplified in which the transmission device 90 includes a stepped transmission mechanism, the transmission device 90 may include a continuously variable transmission mechanism. For example, the transmission device 90 may include a continuously variable transmission (CVT) that allows continuous gear shifting by looping a belt or a chain around two pulleys to change the diameters of the pulleys.

In addition, the transmission device 90 has a function of being able to shut off mechanical power transmission between the output member OUT and the rotating electrical machine 80 (or the intermediate member M). In the present embodiment, for easy understanding, a mode is exemplified in which the transmission device 90 includes therein a second engagement device 95 that switches between a state in which drive power is transmitted between the input shaft and output shaft of the transmission device 90 and a state in which drive power is shut off between the input shaft and output shaft of the transmission device 90. For example, when the transmission device 90 is an automatic transmission device, the second engagement device 95 may be formed using a planetary gear mechanism. With the planetary gear mechanism, the second engagement device 95 can be formed using one or both of a clutch and a brake. Though FIG. 1 exemplifies the second engagement device 95 as a clutch, the second engagement device 95 is not limited to a clutch and may be formed using a brake.

Meanwhile, in FIG. 1, reference sign 73 indicates a rotation sensor that detects the rotational speed of the internal combustion engine 70 or the input member IN, and reference sign 93 indicates a rotation sensor that detects the rotational speed of the wheels W or the output member OUT. In addition, though details will be described later, reference sign 13 indicates a rotation sensor such as a resolver that detects the rotation (speed, direction, angular velocity, etc.) of a rotor of the rotating electrical machine 80, and reference sign 12 indicates an alternating-current sensor that detects current flowing through the rotating electrical machine 80. Note that in FIG. 1 various types of oil pumps (a motor-driven system and a mechanical system), etc., are omitted.

Figure 2:
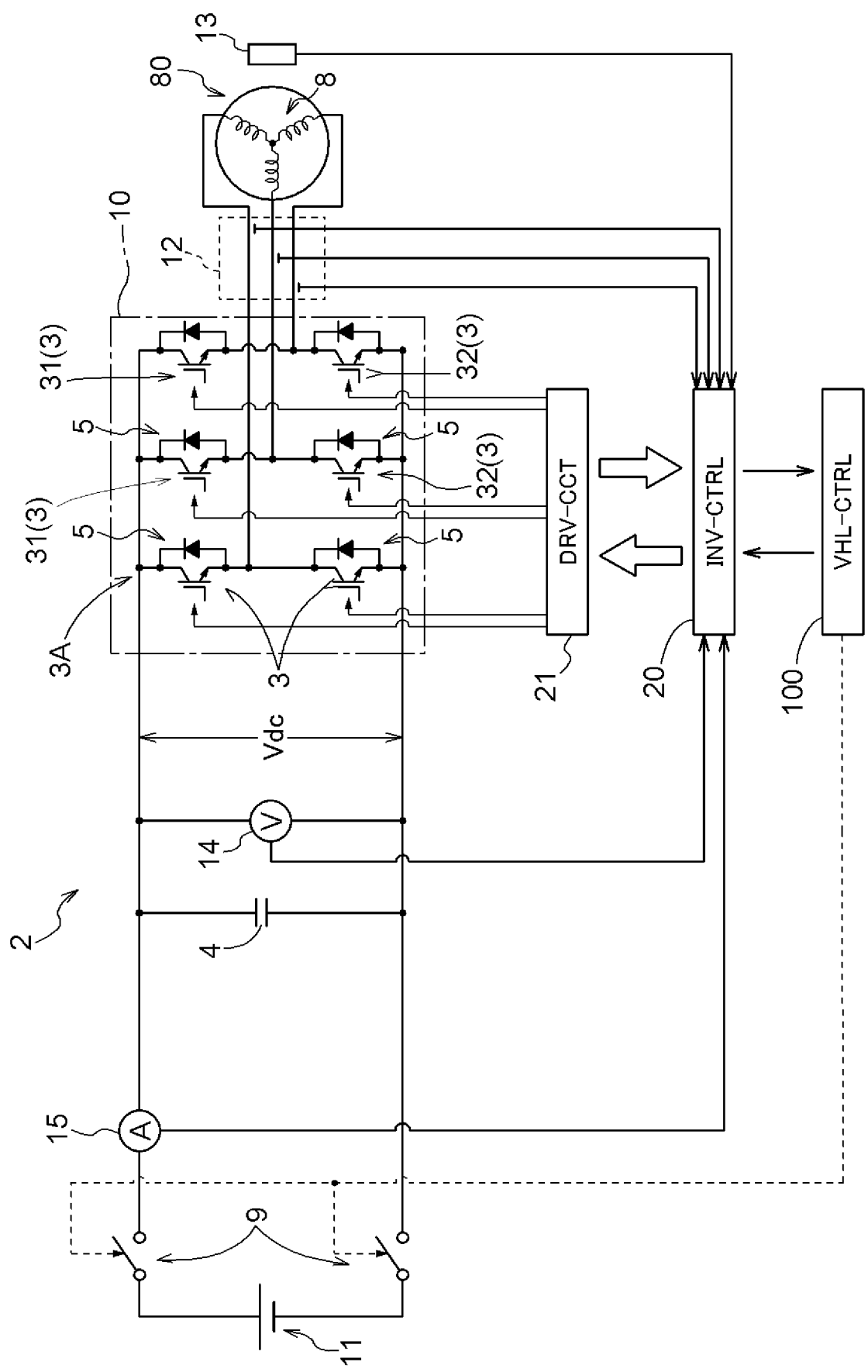
FIG. 2 is a schematic circuit block diagram of a control system of a rotating electrical machine.

As described above, the drive of the rotating electrical machine 80 is controlled by the inverter control device 20 through the inverter 10. A block diagram of FIG. 2 schematically shows a rotating electrical machine drive device 2. Note that reference sign 14 indicates a voltage sensor that detects voltage on a direct-current side of the inverter 10 (a direct-current link voltage Vdc which will be described later), and reference sign 15 indicates a battery current sensor that detects current (battery current) flowing through a high-voltage battery 11 (direct-current power supply) which will be described later.

The inverter 10 is connected to the high-voltage battery 11 through contactors 9 which will be described later and connected to the alternating-current rotating electrical machine 80 to convert electric power between direct current and alternating current of a plurality of phases (here, three-phase alternating current). The rotating electrical machine 80 serving as a drive power source for the vehicle is a rotating electrical machine that operates by alternating current of a plurality of phases (here, three-phase alternating current), and can also function as an electric motor and as a generator. Namely, the rotating electrical machine 80 converts electric power from the high-voltage battery 11 into mechanical power through the inverter 10 (motoring). Alternatively, the rotating electrical machine 80 converts rotary drive power transmitted from the internal combustion engine 70 or the wheels W into electric power, and charges the high-voltage battery 11 through the inverter 10 (regeneration).

The high-voltage battery 11 serving as an electric power source for driving the rotating electrical machine 80 is formed of, for example, a secondary battery (battery) such as a nickel-hydrogen battery or a lithium-ion battery, or an electric double-layer capacitor. The high-voltage battery 11 is a high-voltage, high-capacity direct-current power supply so as to supply electric power to the rotating electrical machine 80. The rated power supply voltage of the high-voltage battery 11 is, for example, 200 to 400 [V].

On the direct-current side of the inverter 10 there is provided a smoothing capacitor (direct-current link capacitor 4) that smooths voltage (the direct-current link voltage Vdc) between a positive polarity and a negative polarity. The direct-current link capacitor 4 stabilizes the direct-current link voltage Vdc that fluctuates according to the fluctuations of power consumption of the rotating electrical machine 80.

The contactors 9 are disposed, as shown in FIG. 2, between the high-voltage battery 11 and the inverter 10, specifically, between the direct-current link capacitor 4 and the high-voltage battery 11. The contactors 9 can cut off an electrical connection between the rotating electrical machine drive device 2 and the high-voltage battery 11. When the contactors 9 are in a connected state (closed state), the high-voltage battery 11 and the inverter 10 (and the rotating electrical machine 80) are electrically connected to each other, and when the contactors 9 are in a released state (open state), an electrical connection between the high-voltage battery 11 and the inverter 10 (and the rotating electrical machine 80) is cut off.

Note that in the present embodiment, as shown in FIG. 1, accessories 60 such as an air conditioner 61 that adjusts vehicle interior's temperature and humidity and a DC/DC converter (DC/DC) 62 that converts direct-current voltage in order to drive a motor-driven oil pump (not shown), etc., may be provided between the high-voltage battery 11 and the inverter 10. It is preferred that the accessories 60 be disposed between the contactors 9 and the direct-current link capacitor 4.

In the present embodiment, the contactors 9 are mechanical relays that open and close based on instructions from the vehicle control device 100 serving as a vehicle electric control unit (vehicle electronic control unit (ECU)) which is one of the highest-level control devices of the vehicle, and are referred to as, for example, system main relays (SMR) or main contactors (MC). When a vehicle's ignition switch or main switch is in an on state (effective state), contacts of the contactors 9 are closed and the contactors 9 go into a conduction state (connected state), and when the ignition switch or main switch is in an off state (ineffective state), the contacts of the contactors 9 are opened and the contactors 9 go into a non-conduction state (released state).

As described above, the inverter 10 converts direct-current electric power having the direct-current link voltage Vdc into alternating-current electric power of a plurality of phases (n phases with n being a natural number; here, three phases) and supplies the alternating-current electric power to the rotating electrical machine 80, and converts alternating-current electric power generated by the rotating electrical machine 80 into direct-current electric power and supplies the direct-current electric power to the direct-current power supply. The inverter 10 is configured to include a plurality of switching elements 3. For the switching elements 3, it is preferred to apply power semiconductor devices that can operate at high frequencies such as insulated gate bipolar transistors (IGBTs), power metal oxide semiconductor field effect transistors (MOSFETs), silicon carbide-metal oxide semiconductor FETs (SiC-MOSFETs), SiC-static induction transistors (SiC-SITs), and gallium nitride-MOSFETs (GaN-MOSFETs). FIG. 2 exemplifies a mode in which IGBTs are used as the switching elements 3.

As shown in FIG. 2, the inverter 10 is formed of a bridge circuit having arms 3A whose number corresponds to the number of a plurality of phases (here, three phases). That is, as shown in FIG. 1, one arm 3A is formed by connecting two switching elements 3 (an upper-stage-side switching element 31 and a lower-stage-side switching element 32) in series between the direct-current positive polarity side and direct-current negative polarity side of the inverter 10. In the case of three-phase alternating current, three (three-phase) series circuits (three arms 3A) are connected in parallel to each other. That is, one series circuit (arm 3A) corresponds to each of stator coils 8 for the U-, V-, and W-phases of the rotating electrical machine 80. In addition, a freewheeling diode 5 is provided in parallel to each switching element 3, with a direction going from the negative polarity to the positive polarity (a direction going from the lower-stage side to the upper-stage side) being a forward direction.

Figure 3:
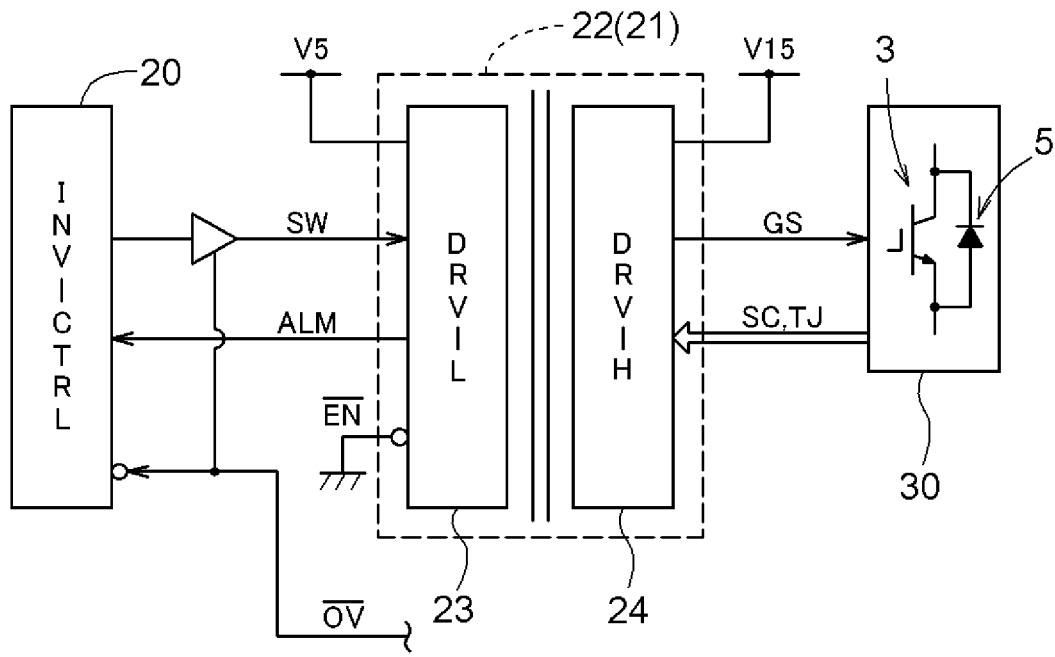
FIG. 3 is a schematic circuit block diagram of a drive circuit.

In the present embodiment, as shown in FIG. 3, a power module 30 is configured to include at least one IGBT (switching element 3) and a freewheeling diode 5 connected in parallel to the IGBT. Such a power module 30 may have a function of detecting current flowing through the switching element 3, and a function of detecting the temperature of the switching element 3. Such functions may output a detected value as a signal, or may output a notification signal when the detected value exceeds a predefined threshold value. In the present embodiment, as exemplified in FIG. 3, a temperature detection signal SC and a temperature detection signal TJ are outputted from the power module 30.

As shown in FIGS. 1 and 2, the inverter 10 is controlled by the inverter control device 20. The inverter control device 20 is constructed using a logic circuit such as a microcomputer as a core member. For example, the inverter control device 20 controls the rotating electrical machine 80 through the inverter 10 by performing current feedback control using a vector control method, based on target torque of the rotating electrical machine 80 which is provided from another control device such as the vehicle control device 100, etc.

Actual currents (Iu, Iv, and Iw: see FIG. 6, etc.) flowing through the stator coils 8 for the respective phases of the rotating electrical machine 80 are detected by the alternating-current sensor 12, and the inverter control device 20 obtains results of the detection. In addition, a magnetic pole position at each time point of the rotor of the rotating electrical machine 80 is detected by a rotation sensor 13 such as a resolver, and the inverter control device 20 obtains a result of the detection. The inverter control device 20 performs current feedback control using the results of the detection by the alternating-current sensor 12 and the rotation sensor 13. The inverter control device 20 is configured to include various functional parts for current feedback control, and each functional part is implemented by cooperation of hardware such as a microcomputer and software (program).

The power supply voltage of the vehicle control device 100, the inverter control device 20, etc., is, for example, 5

[V] or 3.3 [V]. On the vehicle there is also mounted, in addition to the high-voltage battery 11, a low-voltage battery (not shown) which is a power supply having a lower voltage than the high-voltage battery 11 and isolated from the high-voltage battery 11. The power supply voltage of the low-voltage battery is, for example, 12 to 24 [V]. The low-voltage battery supplies electric power to the inverter control device 20 and the vehicle control device 100 through, for example, a regulator circuit that regulates voltage. The power supply voltage of the vehicle control device 100, the inverter control device 20, etc., is, for example, 5 [V] or 3.3 [V].

As shown in FIG. 1, a control terminal of each switching element 3 (e.g., a gate terminal in the case of an IGBT or a FET) included in the inverter 10 is connected to the inverter control device 20 through the drive circuit 21, and switching control of the switching elements 3 is individually performed. A high-voltage system circuit for driving the rotating electrical machine 80 and a low-voltage system circuit such as the inverter control device 20 that uses a microcomputer, etc., as a core greatly differ in operating voltage (the power supply voltage of the circuits). Hence, the drive circuit 21 (DRV-CCT) is provided that improves each of driving capabilities (capabilities to allow a circuit at a subsequent stage to operate, e.g., voltage amplitude and output current) of a drive signal (switching control signal) for each switching element 3, and relays the drive signal.

FIG. 3 shows an example of the drive circuit 21. The drive circuit 21 is formed using, for example, a circuit that uses an isolation element such as a photocoupler, a magnetic coupler, or a transformer, a driver IC including such an element, etc. FIG. 3 exemplifies a driver IC 22 including a low-voltage-side drive circuit 23 connected to a so-called low-voltage circuit side which is an inverter control device 20 side; and a high-voltage-side drive circuit 24 connected to a so-called high-voltage circuit side which is a power module 30 side. The low-voltage-side drive circuit 23 is isolated from the high-voltage-side drive circuit 24. For example, the low-voltage-side drive circuit 23 operates by a control circuit power supply V5 with voltage on the order of 3.3 to 5 [V], and the high-voltage-side drive circuit 24 operates by a drive power supply V15 with voltage on the order of 15 to 20 [V].

The inverter control device 20 also operates by the control circuit power supply V5. A switching control signal SW generated by and outputted from the inverter control device 20 is inputted to the low-voltage-side drive circuit 23 through a buffer for boosting output current, performing impedance conversion, etc., and is provided as a gate signal GS to each power module 30 (switching element 3) through the high-voltage-side drive circuit 24. The drive circuit 21 also relays a temperature detection signal SC and a temperature detection signal TJ which are outputted from the power module 30, and provides those signals to the inverter control device 20 which is the other way around from the switching control signal SW. The drive circuit 21 itself also has, for example, an abnormality detection function such as monitoring of voltage of the drive power supply V15. The present embodiment exemplifies a mode in which when the temperature detection signal SC or the temperature detection signal TJ indicates an abnormality or when the drive circuit 21 has detected an abnormality, an alarm signal ALM is outputted to the inverter control device 20.

Note that it is preferred that the inverter control device 20 be configured to accept, as input, an abnormality signal, for example, when the voltage sensor 14 that detects the direct-current link voltage Vdc has detected overvoltage or when the battery current sensor 15 that detects current inputted or outputted to/from the high-voltage battery has detected overcurrent, too. FIG. 3 exemplifies a mode in which an overvoltage detection signal OV which is outputted when the voltage sensor 14 has detected overvoltage is provided to the inverter control device 20. In the present embodiment, the overvoltage detection signal OV is a negative logic signal, and its logic level at normal times is in a high state. The overvoltage detection signal OV is also connected to a control terminal of a tri-state buffer that relays the switching control signal SW to the low-voltage-side drive circuit 23. In the present embodiment, when overvoltage has occurred, the logic level of the overvoltage detection signal OV goes into a low state, by which the switching control signal SW is interrupted, enabling to bring all switching elements 3 of the inverter 10 into an off state. Note that depiction of a pull-up resistor, a pull-down resistor, or the like, for fixing the logic level of a signal which is inputted to the low-voltage-side drive circuit 23 upon interruption is omitted.

In addition, the drive circuit 21 has an enable terminal EN (negative logic), and when a signal inputted to the enable terminal EN is not enabled (at a high level), the switching control signal SW is interrupted and a low-level gate signal GS is outputted. Although the present embodiment exemplifies a mode in which the enable terminal EN is fixed at a low level, in order to promptly disable the gate signal GS, a signal indicating a failure or an abnormality may be connected. In addition, for example, when the drive circuit 21 outputs an alarm signal ALM or when the drive circuit 21 accepts, as input, a temperature detection signal SC or a temperature detection signal TJ indicating an abnormality, the drive circuit 21 may set the gate signal GS to a low level and output the gate signal GS, regardless of the state of the switching control signal SW.

The inverter control device 20 has, for example, two control modes, pulse width modulation (PWM) control and rectangular-wave control (single-pulse control), as modes of switching patterns (modes of voltage waveform control) of the switching elements 3 included in the inverter 10. In addition, the inverter control device 20 has, as modes of stator's field control, field regulation control such as normal field control, e.g., maximum torque control for outputting maximum torque with respect to motor current and maximum efficiency control for driving the motor at maximum efficiency with respect to motor current, field weakening control for weakening field flux by allowing field current (d-axis current Id) that does not contribute to torque to flow or, oppositely, field strengthening control for strengthening field flux. The pulse width modulation, the rectangular-wave control (single-pulse control), the normal field control, the field weakening control, the field strengthening control, etc., are publicly known and thus a detailed description thereof is omitted.

As described above, in the present embodiment, the rotating electrical machine 80 is controlled by performing current feedback control using a current vector control method in a two-axis orthogonal vector space (orthogonal vector coordinate system) that rotates in synchronization with the rotation of the rotating electrical machine 80. In the current vector control method, current feedback control is performed, for example, in a two-axis orthogonal vector coordinate system (d-q-axis vector coordinate system) having a d-axis (a field current axis or a field axis) along a direction of field flux generated by permanent magnets, and a q-axis (a drive current axis or a drive axis) which is electrically advanced by $\pi/2$ relative to the d-axis. The inverter control device 20 determines a torque instruction T* based on target torque of the rotating electrical machine 80 to be controlled, and determines a d-axis current instruction Id* and a q-axis current instruction Iq*.

The inverter control device 20 finds deviations between those current instructions (Id* and Iq*) and actual currents (Iu, Iv, and Iw) flowing through the coils for the respective U-, V-, and W-phases of the rotating electrical machine 80, and performs a proportional-integral control computation (PI control computation) or a proportional-integral-differential control computation (PID control computation), and finally determines three-phase voltage instructions. Based on the voltage instructions, a switching control signal is generated. A mutual coordinate transformation between the actual three-phase coordinate system of the rotating electrical machine 80 and the two-axis orthogonal vector coordinate system is performed based on a magnetic pole position θ detected by the rotation sensor 13. In addition, a rotational speed ω (angular velocity or revolutions per minute (rpm)) of the rotating electrical machine 80 is derived from a result of detection by the rotation sensor 13.

A brief description of field regulation control is added below. Normal field control such as maximum torque control and maximum efficiency control is a control mode that uses basic current instruction values (a d-axis current instruction Id* and a q-axis current instruction Iq*) which are set based on target torque of the rotating electrical machine 80. On the other hand, field weakening control is a control mode in which of the basic current instruction values, the d-axis current instruction Id* is regulated in order to weaken field flux from the stator. In addition, field strengthening control is a control mode in which of the basic current instruction values, the d-axis current instruction Id* is regulated in order to strengthen field flux from the stator. Upon field weakening control, field strengthening control, etc., the d-axis current Id is thus regulated, but it is also possible to regulate the q-axis current Iq likewise. For example, upon stopping the inverter 10, etc., by reducing the q-axis current Iq, the torque of the rotating electrical machine 80 can be promptly reduced. In addition, likewise, upon stopping the inverter 10, in order to promptly reduce energy charged in the direct-current link capacitor 4, by adjusting the d-axis current Id and the q-axis current Iq, armature current (current corresponding to a vector sum of the d-axis current Id and the q-axis current Iq) is increased without increasing torque (or while reducing torque), by which loss can be intentionally increased.

Meanwhile, as described above, when various abnormalities are detected in the inverter 10, etc., the vehicle drive control device 1 including the inverter control device 20 performs so-called fail-safe control. As the fail-safe control, the vehicle drive control device 1 changes the transmission state of drive power by the first engagement device 75 or the second engagement device 95, or changes a control scheme of the switching elements 3 of the inverter 10. Here, fail-safe control in which the inverter control device 20 changes the control scheme of the switching elements 3 of the inverter 10 will be described.

As fail-safe control whose control target is the inverter 10, for example, shutdown control (SDN) is known. The shutdown control is control for bringing the inverter 10 into an off state by changing switching control signals SW for all switching elements 3 included in the inverter 10 to an inactive state. At this time, when the rotor of the rotating electrical machine 80 continues to rotate at a relatively high speed by inertia, large counter-electromotive force is generated. Electric power generated by the rotation of the rotor is rectified through the freewheeling diodes 5, and charges the high-voltage battery 11 when the contactors 9 are in a closed state. When the absolute value of current (battery current) that charges the high-voltage battery 11 significantly increases and the battery current exceeds the rated current of the high-voltage battery 11, it causes exhaustion, etc., of the high-voltage battery 11. If the rated value of the high-voltage battery 11 is increased so that the high-voltage battery 11 can withstand large battery current, then there is a possibility of causing an increase in size and an increase in cost.

On the other hand, when the contactors 9 are in an open state, the flow of current into the high-voltage battery 11 is shut off. The current whose flow into the high-voltage battery 11 is shut off charges the direct-current link capacitor 4, increasing the direct-current link voltage Vdc. It is not desirable that the direct-current link voltage Vdc exceed the rated voltages (absolute maximum ratings) of the inverter 10 (switching elements 3) and the direct-current link capacitor 4. If those rated values are increased so that high voltage can be allowed, then there is a possibility of causing an increase in size and an increase in cost. In addition, when, as shown in FIG. 1, the direct-current link voltage Vdc is also applied to the accessories 60 such as the air conditioner 61 and the DC/DC converter 62, the same can also be said for the accessories 60.

As fail-safe control whose control target is the inverter 10, active short-circuit control (ASC) is also known in addition to the shutdown control. The active short-circuit control is control for allowing current to flow back between the rotating electrical machine 80 and the inverter 10 by bringing one side, the upper-stage-side switching elements 31 of the arms 3A for all of the plurality of phases or the lower-stage-side switching elements 32 of the arms for all of the plurality of phases, into an on state and bringing the other side into an off state. Note that a case in which the upper-stage-side switching elements 31 of the arms 3A for all of the plurality of phases are brought into an on state and the lower-stage-side switching elements 32 of the arms 3A for all of the plurality of phases are brought into an off state is referred to as upper-stage-side active short-circuit control (HASC). Note also that a case in which the lower-stage-side switching elements 32 of the arms 3A for all of the plurality of phases are brought into an on state and the upper-stage-side switching elements 31 of the arms 3A for all of the plurality of phases are brought into an off state is referred to as lower-stage-side active short-circuit control (LASC).

The active short-circuit control does not involve a sudden increase in the direct-current link voltage Vdc or a sudden increase in the charging current of the high-voltage battery 11. Note, however, that when the short-circuit current of the rotating electrical machine 80 is large, large flow-back current flows through the stator coils 8 and the inverter 10. If the large current continues to flow over an extended period of time, then there is a possibility that the inverter 10 and the rotating electrical machine 80 wear out due to heat generation, etc., caused by the large current.

Figure 4:
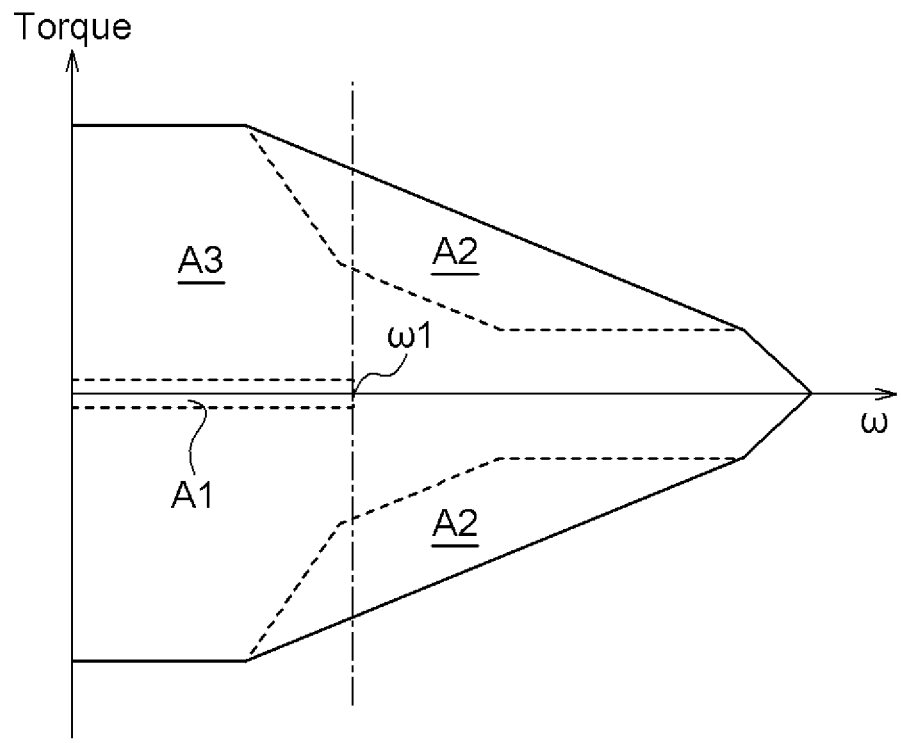
FIG. 4 is a speed-torque map of the rotating electrical machine.

Therefore, it is desirable that fail-safe control be appropriately performed based on, for example, the conditions of the vehicle drive device 7 including the inverter 10 and the rotating electrical machine 80 which are obtained upon the occurrence of an abnormality, and the features of each control scheme. FIG. 4 shows a speed-torque map of the rotating electrical machine. For example, when the rotational speed ω of the rotating electrical machine 80 is higher than or equal to a defined rotational speed w1 which is defined in advance, the inverter control device 20 performs active short-circuit control, and when the rotational speed ω is less than the defined rotational speed ω1, the inverter control device 20 performs shutdown control for bringing all switching elements 3 of the inverter 10 all into an off state.

Note that "A1", "A2", and "A3" of FIG. 4 indicate operating regions to which are applied schemes for detecting a turn-off failure which will be described later. A first operating region A1 with a small absolute value of torque and a low rotational speed ω is a region in which a turn-off failure is not detected. Second operating regions A2 with a large absolute value of torque and a high rotational speed ω are regions in which a turn-off failure is detected by detection of overcurrent (which will be described later with reference to FIGS. 6, 7, etc.). A third operating region A3 is a region in which a turn-off failure is detected using alternating currents (Iu, Iv, and Iw) (using a mutual relationship between three-phase currents). Note that although the present embodiment exemplifies a mode in which the maximum rotational speed in the first operating region A1 and the defined rotational speed ω1 are identical speeds, the maximum rotational speed in the first operating region A1 and the defined rotational speed ω1 may be different rotational speeds.

Depending on the rotation state of the rotating electrical machine 80 and the state of the inverter 10, for example, when the rotational speed ω of the rotating electrical machine 80 is high and there is an abnormality in a switching element 3 of the inverter 10, neither the above-described shutdown control nor active short-circuit control may be able to be selected as fail-safe control. In such a case, torque reduction control for reducing the torque of the rotating electrical machine 80 is also one type of fail-safe control. The torque reduction control is control for reducing the torque of the rotating electrical machine 80, with continuation of torque control for controlling the rotating electrical machine 80 based on target torque or rotational speed control for controlling the rotating electrical machine 80 based on a target speed.

Figure 5:
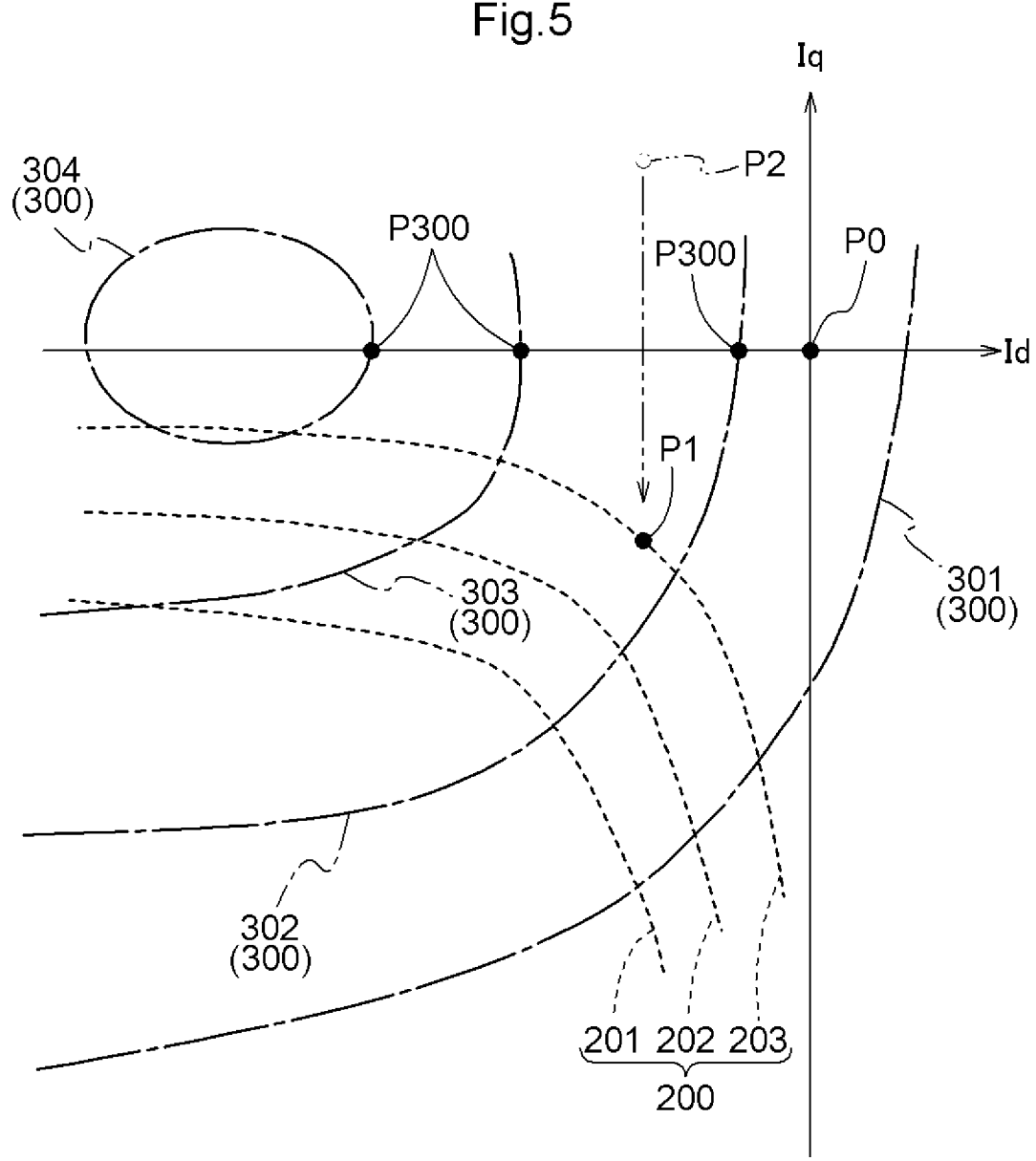
FIG. 5 is a diagram showing operating points of the rotating electrical machine in a current vector coordinate system.

Here, zero-torque control which is an example of such control will be described. FIG. 5 schematically shows operating points (P1, etc.) of the rotating electrical machine 80 in a current vector space (current vector coordinate system). In FIG. 5, reference signs "200" (201 to 203) each indicate an equal torque line representing a vector locus of armature current at which the rotating electrical machine 80 outputs given torque. A second equal torque line 202 is lower in torque than a first equal torque line 201, and a third equal torque line 203 is even lower in torque than the second equal torque line 202.

Curves "300" each represent a voltage speed ellipse (voltage limit ellipse). When the counter-electromotive voltage of the rotating electrical machine 80 exceeds the direct-current link voltage Vdc, it becomes unable to control the rotating electrical machine 80, and thus, a range of current instructions that can be set is limited by a voltage speed ellipse 300 which is a vector locus of armature current (a vector sum of a d-axis current Id and a q-axis current Iq). In other words, the voltage speed ellipse is a vector locus representing a range of current instructions that can be set based on the value of direct-current voltage (direct-current link voltage Vdc) of the inverter 10 and the rotational speed ω of the rotating electrical machine 80 that influences the magnitude of counter-electromotive voltage. That is, the size of the voltage speed ellipse 300 is determined based on the direct-current link voltage Vdc and the rotational speed ω of the rotating electrical machine 80. Specifically, the diameter of the voltage speed ellipse 300 is proportional to the direct-current link voltage Vdc, and is inversely proportional to the rotational speed ω of the rotating electrical machine 80. Current instructions (Id* and Iq*) are set as values at an operating point on an equal torque line 200 present within a voltage speed ellipse 300 in such a current vector coordinate system.

It is assumed that the inverter control device 20 is controlling the rotating electrical machine 80, for example, in torque mode (e.g., pulse width modulation control based on target torque) as normal operation at a point in time when the inverter control device 20 has determined that fail-safe control (zero-torque control) needs to be performed. A first operating point P1 shown in FIG. 5 indicates an operating point of the rotating electrical machine 80 in the current vector coordinate system at this point in time. In other words, the rotating electrical machine 80 is performing regeneration operation in torque mode which is normal operation, at the first operating point P1 on the third equal torque line 203. Although here, for convenience sake, a mode in which the rotating electrical machine 80 is performing regeneration operation is exemplified, for example, it may be considered that the rotating electrical machine 80 having performed motoring operation at a second operating point P2 represented by an open white circle has transitioned to regeneration operation.

Upon performing zero-torque control, the inverter control device 20 sets a torque instruction T* such that the torque of the rotating electrical machine 80 reaches zero, by which the q-axis current Iq (drive current) is reduced to a zero state. At this time, the q-axis current Iq may be reduced and the d-axis current Id (field current) may be increased to increase armature current, with the torque (=zero) based on the torque instruction T* being maintained. When a point of origin is included in a range of a voltage speed ellipse 300 like a first voltage speed ellipse 301, the inverter control device 20 performs control such that an operating point moves to the point of origin (P0). In addition, when the point of origin is not included in a range of a voltage speed ellipse 300 like a second voltage speed ellipse 302, a third voltage speed ellipse 303, and a fourth voltage speed ellipse 304, the inverter control device 20 performs control such that an operating point moves to a point of intersection of the voltage speed ellipse 300 and the d-axis (P300).

For example, when the contactors 9 are opened, by allowing more armature current than regeneration current to flow, electric charge can be emitted from the direct-current link capacitor 4. At this time, particularly, for the d-axis current Id that does not contribute to torque, it is also preferred that more d-axis current Id continue to flow without reducing the amount of the current, to increase loss. For example, while the torque is allowed to approach zero by reducing the q-axis current Iq from the first operating point P1, the d-axis current Id may be increased. It is preferred that a locus of an operating point be set based on the coordinates of the operating point, the decrease rate of the q-axis current Iq, and the increase rate of the d-axis current Id, prioritizing a reduction in the q-axis current Iq.

Although the above exemplifies a mode in which zero-torque control (torque reduction control) is performed, deceleration control for outputting torque in a reverse direction from a rotation direction of the rotating electrical machine 80 may be performed. For example, the second operating point P2 may be allowed to move to the first operating point P1 by changing the q-axis current Iq within a range in which the q-axis current Iq does not exceed a voltage speed ellipse 300, without changing the d-axis current Id.

As described above, when one of the switching elements 3 of the inverter 10 has an abnormality, e.g., a turn-off failure in which the switching element 3 is always fixed in an off state, active short-circuit control may not be able to be performed. That is, when a turn-off failure has occurred in one of switching elements 3 to be controlled to an on state upon performing active short-circuit control, currents flowing through the respective phases lose balance as will be described later with reference to FIGS. 6, 7, etc., and there is a possibility that excessive current flows through sound switching elements 3 having no failure. As described above, some switching elements 3 are formed as power modules 30 having an overcurrent detection function and an overheat detection function. When excessive current flows, an overcurrent state and an overheat state are detected, and by various fail-safe functions of the inverter control device 20 and the drive circuit 21 such as those described above, the switching elements 3 may be forcibly controlled to an off state. By this, despite the fact that active short-circuit control has been performed, the state becomes equivalent to a state in which shutdown control has been performed, which may cause a sudden increase in the direct-current link voltage Vdc or a sudden increase in battery current.

Hence, in a state in which one of the switching elements 3 included in the inverter 10 has a turn-off failure in which the switching element 3 always goes into an off state, the inverter control device 20 performs torque reduction control (zero-torque control) for reducing the torque of the rotating electrical machine 80, or deceleration control for outputting torque in a reverse direction from a rotation direction of the rotating electrical machine 80. With also reference to FIGS. 6 to 8, a mode in which zero-torque control is performed will be described below as an example. A waveform diagram of FIG. 6 shows an example of currents and torque obtained upon normal control in a turn-off failure state. A waveform diagram of FIG. 7 shows an example of currents and torque obtained upon zero-torque control in a turn-off failure state. A flowchart of FIG. 8 shows an example of fail-safe control in a turn-off failure state.

As shown in FIGS. 6 and 7, when one switching element 3 has a turn-off failure, three-phase alternating currents (Iu, Iv, and Iw) lose their symmetry. It is possible to determine whether there is a turn-off failure and to identify a switching element 3 having a turn-off failure, by analyzing a mutual relationship between the U-phase current Iu, the V-phase current Iv, and the W-phase current Iw. For example, in the third operating region A3 of FIG. 4, the inverter control device 20 can detect a turn-off failure by performing such an analysis on the mutual relationship between three-phase alternating currents. In addition, as shown in FIG. 6 (right side portion), there is also a possibility that the peak value of any of the alternating currents for a single phase exceeds a defined current Ith which is defined in advance. When the instantaneous value of any one or more phase current is greater than or equal to the defined current Ith, the inverter control device 20 can determine that a switching element 3 has a turn-off failure. Note that for the defined current Ith, for example, allowable current that the switching elements 3 can allow can also be used. In the second operating regions A2 of FIG. 4, the inverter control device 20 can detect a turn-off failure by such overcurrent detection.

A technique for analyzing the mutual relationship between three-phase alternating currents is publicly known as presented in, for example, the technical paper "A. M. S. Mendes and A. J. Marques, "Voltage Source Inverter Fault Diagnosis in Variable Speed AC Drives, by the Average Current Park's Vector Approach", 0-7803-5293-9/99, $10.00, 1999, IEEE", and thus, a detailed description thereof is omitted. Note that as shown in FIG. 6, the d-axis current Id and the q-axis current Iq also significantly oscillate when a turn-off failure has occurred. In addition, torque T also significantly oscillates with respect to a torque instruction T*. Hence, it is also possible to determine whether there is a turn-off failure, based on the dq-axis currents or the torque T.

Figure 8:
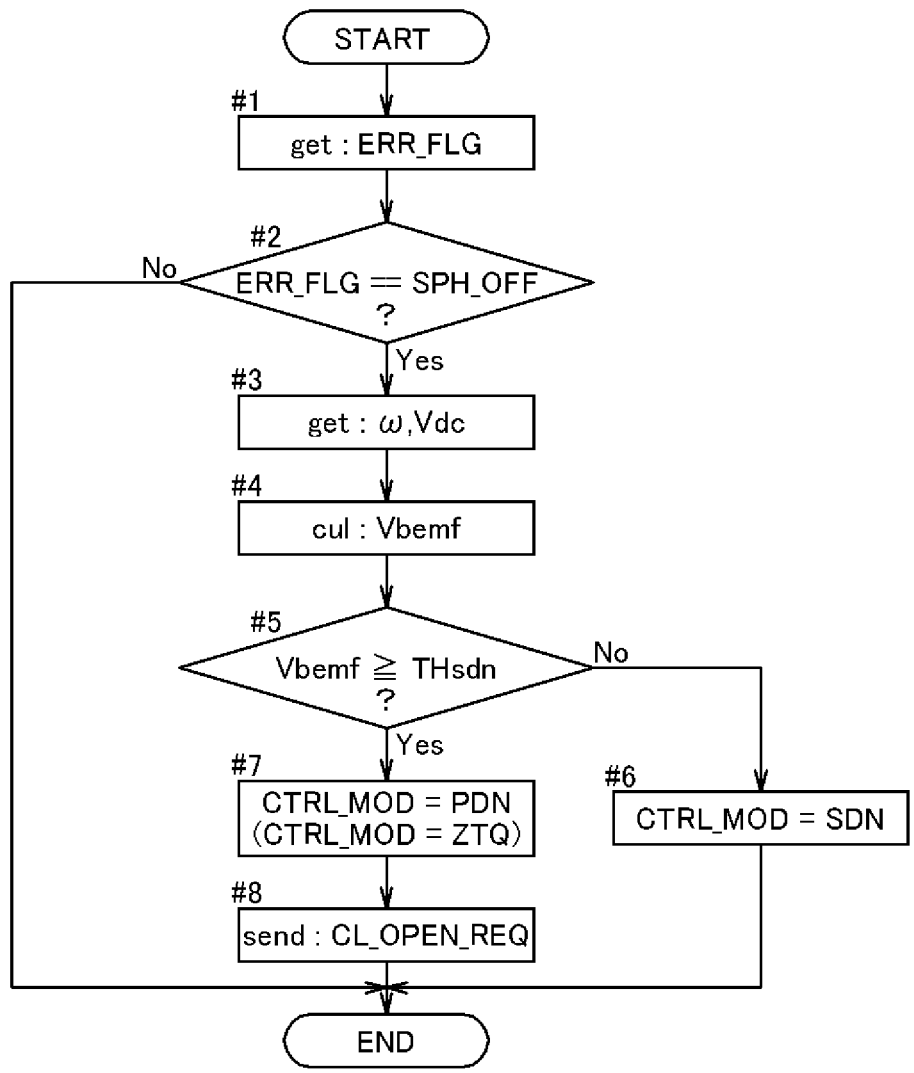
FIG. 8 is a flowchart showing an example of fail-safe control in a turn-off failure state.

As shown in FIG. 8, when the inverter control device 20 has determined that some kind of abnormality has occurred in the inverter 10 or the rotating electrical machine 80, first, the inverter control device 20 obtains an error flag (ERR_FLG) (#1). Then, it is determined whether the error flag indicates a single-phase turn-off failure (SPH_OFF: Single Phase Off Fail) of a switching element 3 included in the inverter 10 (#2). If the error flag does not indicate a single-phase turn-off failure, the process ends, and if the error flag indicates a single-phase turn-off failure, the values of the rotational speed ω of the rotating electrical machine 80 and the direct-current link voltage Vdc are obtained (#3).

Subsequently, the inverter control device 20 calculates counter-electromotive voltage Vbemf based on the rotational speed ω (#4). Specifically, counter-electromotive voltage Vbemf is calculated based on the electromagnetic specifications of the rotating electrical machine 80 (the numbers of windings on the stator coils 8, the magnetic flux of permanent magnets on the rotor, the number of magnetic poles, etc.) and the rotational speed ω which is a variable. If shutdown control is performed when the counter-electromotive voltage Vbemf is larger than the direct-current link voltage Vdc, then there is a possibility that regeneration current flows and charges the direct-current link capacitor 4, increasing the direct-current link voltage Vdc, or large battery current flows into the high-voltage battery 11. At step #5 subsequent to step #4, it is determined whether the counter-electromotive voltage Vbemf is voltage at which shutdown control can be performed. This threshold value for determining whether shutdown can be performed THsdn which is a determination threshold value can be a value set by, for example, referring to a map based on the direct-current link voltage Vdc. For example, a value that defines the first operating region A1 shown in FIG. 4 also corresponds to the threshold value for determining whether shutdown can be performed THsdn.

If the counter-electromotive voltage Vbemf is less than the threshold value for determining whether shutdown can be performed THsdn, shutdown control can be performed. For example, when the operating point of the rotating electrical machine 80 is in a region less than the defined rotational speed ω1 shown in FIG. 4, as described above, selection of shutdown control can be made. Therefore, the inverter control device 20 sets the control mode (CTRL MOD) to shutdown (SDN), and ends the process (#6).

On the other hand, if the counter-electromotive voltage Vbemf is greater than or equal to the threshold value for determining whether shutdown can be performed THsdn, the control mode is set to torque reduction control (PDN) (#7). Preferably, as the torque reduction control, zero-torque control (ZTQ) is performed. For example, the inverter control device 20 performs shutdown control when the operating point is less than the defined rotational speed ω1 shown in FIG. 4, and performs torque reduction control (zero-torque control) when the operating point is greater than or equal to the defined rotational speed ω1.

The waveform diagram of FIG. 7 shows an example of currents and torque obtained upon zero-torque control in a turn-off failure state, and as with the right side portion of FIG. 6, a left side portion shows waveforms for a normal torque control period Tt which is before starting zero-torque control, and a central portion shows waveforms for a zero-torque control period Tzt which is after starting zero-torque control. As is clear from FIG. 7, the currents and torque are significantly reduced. Waveforms at the right side portion of FIG. 7 are enlarged views of the waveforms for the zero-torque control period Tzt.

When the inverter control device 20 sets the control mode to torque reduction control at step #7, next, the inverter control device 20 requests the transmission device control device 40 to bring the second engagement device CL2 into a disengaged state (#8). For example, a disengagement request (CL_OPEN_REQ) for the second engagement device CL2 is transmitted. If the wheels W rotate with the rotating electrical machine 80 drive-coupled to the wheels W, then the rotating electrical machine 80 also continues to rotate, which may also prevent a reduction in occurrence of counter-electromotive force. In addition, in a state in which a switching element 3 has a turn-off failure, as shown in FIG. 6, etc., there is a possibility that ripples occur in the alternating currents (Iu, Iv, and Iw) and ripples also occur in the torque of the rotating electrical machine 80. When the rotating electrical machine 80 is drive-coupled to the wheels W, the ripples propagate through the wheels W, which may affect vehicle ride comfort. Therefore, it is preferred that upon performing fail-safe control such as zero-torque control or deceleration control, mechanical power transmission between the rotating electrical machine 80 and the wheels W be shut off.

Note, however, that since the zero-torque control (torque reduction control) is control for reducing the torque of the rotating electrical machine 80, as shown in FIG. 7, the absolute value of the torque decreases. Therefore, even if ripples occur in the torque, the amplitude thereof decreases. Hence, for example, even if step #8 is not performed and the rotating electrical machine 80 is drive-coupled to the wheels W, the ripples of the rotating electrical machine 80 transmitted to the wheels W are also small and the influence thereof is little. Therefore, when the control mode is set to torque reduction control (zero-torque control) at step #7, step #8 may be skipped.

On the other hand, in the deceleration control, torque for decelerating the rotating electrical machine 80 is outputted, and thus, the torque is large compared to the torque reduction control, and accordingly, ripples also tend to become larger. Hence, when the rotating electrical machine 80 is drive-coupled to the wheels W, torque ripples of the rotating electrical machine 80 are more easily transmitted to the wheels W compared to the torque reduction control. Therefore, when the control mode is set to deceleration control at step #7, it is desirable to perform step #8. In other words, it is desirable that deceleration control be selected in a situation in which step #8 can be performed (the second engagement device CL2 can be disengaged). Namely, it is preferred that the inverter control device 20 perform zero-torque control (torque reduction control) or deceleration control when the second engagement device 95 is in a disengaged state, and perform torque reduction control when the second engagement device 95 is in an engaged state.

Note that it is desirable that torque used for deceleration control be torque that can be outputted in a range in which current flowing through switching elements 3 other than a switching element 3 having a turn-off failure does not exceed allowable current (e.g., the defined current Ith) allowed for each switching element 3. By outputting large torque, it is possible to promptly reduce the rotational speed ω of the rotating electrical machine 80, but flowing of large current resulting therefrom is not desirable.

As described above, the inverter control device 20 controls the drive of the rotating electrical machine 80 by current feedback control based on deviations between the instruction values of alternating current and actual current values. The actual current values are detected by the alternating-current sensor 12. To accurately perform feedback control, an appropriate dynamic range (detection range) based on resolution is set on the alternating-current sensor 12. Alternating current used for fail-safe control such as deceleration control is larger in amplitude than alternating current used upon normal feedback control of the rotating electrical machine 80. If the detection range of the alternating-current sensor 12 is set in accordance with amplitude obtained upon fail-safe control, then the accuracy of current feedback control decreases. In deceleration control, in order to promptly reduce torque, it is also possible to perform the control such that larger alternating current than that at normal times flows, but if the alternating current exceeds the dynamic range of the alternating-current sensor 12, then controllability decreases. Therefore, it is preferred that the inverter control device 20 perform deceleration control using torque that can be outputted in a range in which the value of alternating current does not exceed a detectable range of the alternating-current sensor 12.

The above describes an example of fail-safe control in a turn-off failure state with reference to the flowchart of FIG. 8. However, as described above, as fail-safe control whose control target is the inverter 10, shutdown control (SDN) and active short-circuit control (ASC) are also known. That is, if a switching element 3 is not in a turn-off failure state, then the inverter control device 20 can perform shutdown control or active short-circuit control as fail-safe control. Fail-safe control including failures other than a turn-off failure state will be described below with reference to a flowchart of FIG. 9.

Figure 9:
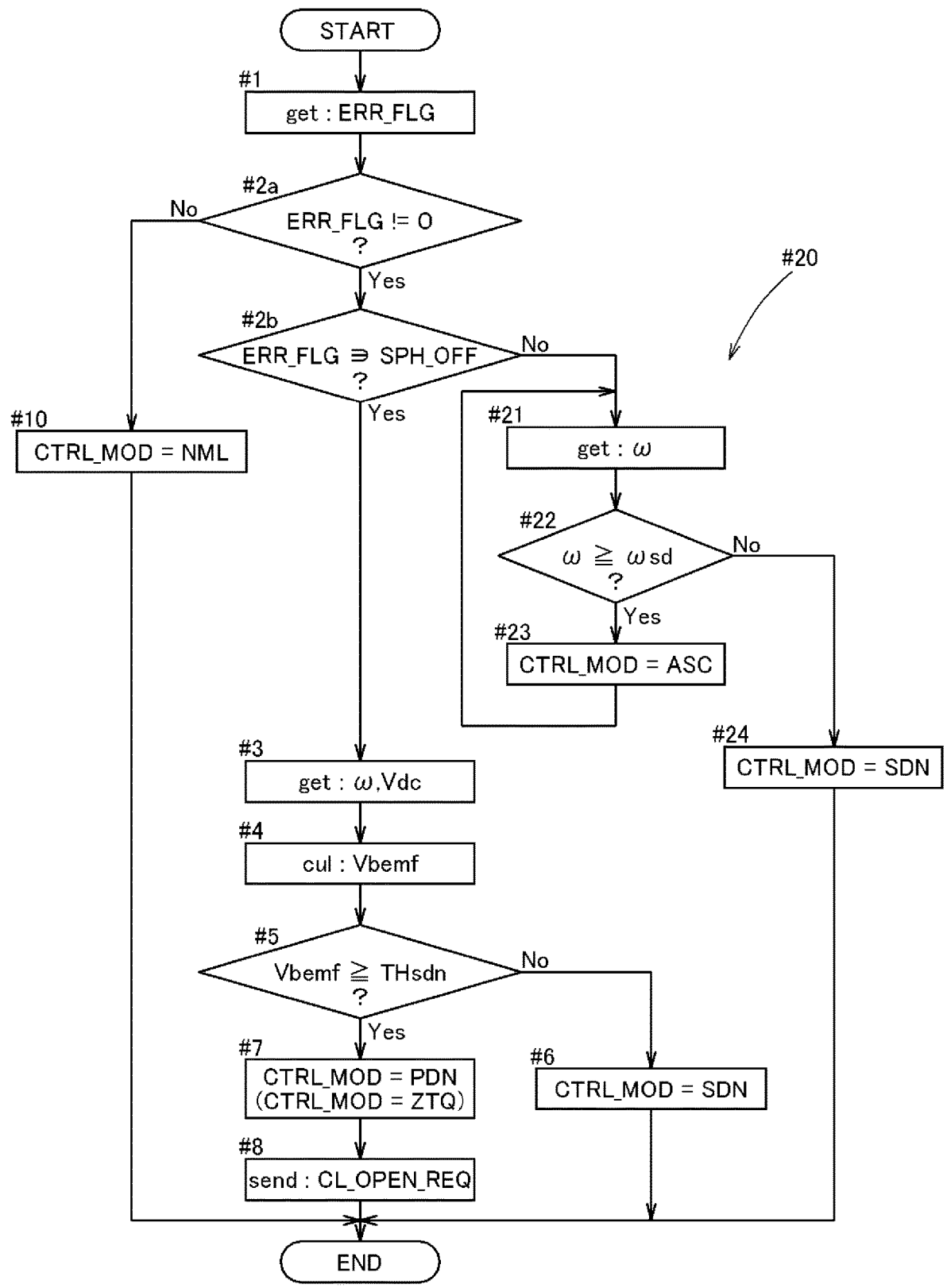
FIG. 9 is a flowchart showing an example of fail-safe control.

A mode described above with reference to FIG. 8 shows an example in which when the inverter control device 20 has determined that some kind of abnormality has occurred in the inverter 10 or the rotating electrical machine 80, the inverter control device 20 obtains an error flag (ERR_FLG). However, here, the inverter control device 20 checks an error flag at all times. As shown in FIG. 9, the inverter control device 20 first obtains an error flag (ERR_FLG) (#1). Here, the error flag is configured to include a plurality of bits, and the inverter control device 20 can determine an abnormality indicated by the error flag, based on which bit is in a valid state. For example, when all bits are in an invalid state (e.g., "0"), a value indicated by an error flag including the plurality of bits is also "0", indicating that an abnormality has not occurred in the inverter 10 or the rotating electrical machine 80. On the other hand, when any of the bits is in a valid state (e.g., "1"), a value indicated by the error flag including the plurality of bits is also a value other than "0", indicating that some kind of abnormality has occurred in the inverter 10 or the rotating electrical machine 80.

After obtaining an error flag at step #1, the inverter control device 20 determines whether the error flag is other than "0" (#2a). If the error flag is not other than "0", i.e., the error flag is "0", it is determined that an abnormality has not occurred in the inverter 10 or the rotating electrical machine 80, and the control mode (CTRL MOD) is re-set to normal control (NML) (#10). If the error flag is other than "0", next, it is determined whether the error flag includes a single-phase turn-off failure (SPH_OFF) (#2b). As described above, an error flag is configured to include a plurality of bits, and an abnormality indicated by the error flag can be determined based on which bit is in a valid state.

If the error flag does not indicate a single-phase turn-off failure, the inverter control device 20 selectively performs shutdown control and active short-circuit control based on the rotational speed ω of the rotating electrical machine 80 (#20). In the present embodiment, as fail-safe control, the inverter control device 20 performs active short-circuit control in a high rotational speed region and performs shutdown control in a low rotational speed region which is on a lower rotational speed side than the high rotational speed region, based on at least the rotational speed of the rotating electrical machine 80. Note that step #20 (#21 to #24) described below with reference to FIG. 9 is an example and other procedures may, of course, be performed.

As described above with reference to FIG. 4, the inverter control device 20 performs active short-circuit control when the rotational speed ω of the rotating electrical machine 80 is higher than or equal to the defined rotational speed ω1 which is defined in advance, and performs shutdown control for bringing all switching elements 3 of the inverter 10 all into an off state, when the rotational speed ω is less than the defined rotational speed ω1. Here, the defined rotational speed ω1 is referred to as a shutdown maximum rotational speed ωsd. That is, the shutdown maximum rotational speed ωsd is a maximum rotational speed at which performance of shutdown control is allowed. A region with a rotational speed higher than the shutdown maximum rotational speed ωsd (defined rotational speed ω1) (or a region with a rotational speed higher than or equal to the shutdown maximum rotational speed) is a high rotational speed region. A region on a lower rotational speed side than the high rotational speed region, i.e., a region with a rotational speed lower than the shutdown maximum rotational speed (or a region with a rotational speed lower than or equal to the shutdown maximum rotational speed), is a low rotational speed region. Note that boundary conditions such as "higher than or equal to/lower than or equal to" and "higher/lower (less than)" can be set as appropriate, and are not intended to limit the configuration of fail-safe control. The same also applies to a case in which other boundaries are shown in the present specification.

In order for the inverter control device 20 to selectively perform shutdown control and active short-circuit control based on the rotational speed ω of the rotating electrical machine 80, first, the inverter control device 20 obtains the value of the rotational speed ω of the rotating electrical machine 80 (#21). Then, the inverter control device 20 determines whether the rotational speed ω is higher than or equal to the shutdown maximum rotational speed ωsd (#22). If the rotational speed ω is higher than or equal to the shutdown maximum rotational speed ωsd, the inverter control device 20 sets the control mode (CTRL MOD) to active short-circuit control (ASC) (#23). On the other hand, if the rotational speed ω is less than the shutdown maximum rotational speed ωsd, the inverter control device 20 sets the control mode (CTRL MOD) to shutdown control (SDN) (#24).

When the inverter control device 20 selects a control scheme of fail-safe control based on the rotational speed of the rotating electrical machine 80, and has selected active short-circuit control first (#23), the inverter control device 20 transitions the control scheme from the active short-circuit control to shutdown control. As shown in FIG. 9, while continuously performing the active short-circuit control, the rotational speed ω of the rotating electrical machine 80 is sequentially obtained (#21) to determine whether the rotational speed ω is higher than or equal to the shutdown maximum rotational speed ωsd (#22). When the rotational speed ω of the rotating electrical machine 80 is reduced along with the performance of the active short-circuit control, the rotational speed ω reaches less than the shutdown maximum rotational speed ωsd, and the inverter control device 20 transitions the control scheme from the active short-circuit control to shutdown control.

Note that failures (abnormalities) different than a turn-off failure include, for example, the following:

(a) overvoltage in which the voltage on the direct-current side of the inverter 10 (direct-current link voltage Vdc) is greater than or equal to a predefined reference voltage;

(b) a current-sensor abnormality in which an abnormality has occurred in the alternating-current sensor 12 that detects alternating current flowing through the stator coils 8 of the rotating electrical machine 80;

(c) a rotation sensor abnormality at startup in which an abnormality has occurred in the rotation sensor 13 that detects rotation of the rotating electrical machine 80, at startup of the rotating electrical machine 80;

(d) a boosted voltage abnormality at startup in which a direct-current boost circuit (converter) which is not shown and which boosts the voltage of the high-voltage battery 11 is provided between the high-voltage battery 11 and the inverter 10, and an abnormality has occurred in boosted voltage at startup of the rotating electrical machine 80, the boosted voltage being obtained by boosting output voltage of the high-voltage battery 11 and being supplied to the inverter 10;

(e) a current sensor's broken-wire abnormality in which a break in a wire has occurred between the alternating-current sensor 12 and the inverter control device 20;

(f) a rotation sensor abnormality in which an abnormality has occurred in the rotation sensor (12); and (g) a boosted voltage abnormality in which an abnormality has occurred in voltage boosted by the direct-current boost circuit (converter).

When the abnormality is the above-described (a) or (b), as described above with reference to FIG. 9, a control scheme of fail-safe control is selected based on the rotational speed of the rotating electrical machine 80, and active short-circuit control or shutdown control is selectively performed. When the abnormality is the above-described (c) or (d), since the rotational speed ω of the rotating electrical machine 80 is low, shutdown control is performed as fail-safe control. When the abnormality is the above-described (e), (f), or (g), taking also into account an increase in the direct-current link voltage Vdc, active short-circuit control is performed as fail-safe control.

If the error flag indicates a single-phase turn-off failure at step #2b, the inverter control device 20 obtains the values of the rotational speed ω of the rotating electrical machine 80 and the direct-current link voltage Vdc (#3). Subsequent steps #4 to #8 are the same as those in a mode described above with reference to FIG. 8, and thus, a detailed description thereof is omitted. Note that the rotational speed ω of the rotating electrical machine 80 decreases by zero-torque control (torque reduction control) or deceleration control, and thus, though depiction is omitted, after step #7 and #8, the control mode may transition to shutdown control to stop the inverter 20.

SUMMARY OF THE EMBODIMENT

A summary of an inverter control device (20) described above will be briefly described below.

In one aspect, in an inverter control device (20) that controls an inverter (10) connected to a direct-current power supply (11) and connected to an alternating-current rotating electrical machine (80) to convert electric power between direct current and alternating current of a plurality of phases, in a state in which one of switching elements (3) included in the inverter (10) has a turn-off failure in which the switching element (3) always goes into an off state, torque reduction control for reducing torque of the rotating electrical machine (80) or deceleration control for outputting torque in a reverse direction from a rotation direction of the rotating electrical machine (80) is performed by performing switching control of the switching elements (3).

According to this configuration, current flowing through the inverter (10) can be controlled by torque reduction control or deceleration control, and thus, it becomes easier to transition to shutdown control later. Namely, according to this configuration, even if one of the switching elements (3) of the inverter (10) has a turn-off failure, fail-safe control can be appropriately performed.

In one aspect, it is preferred that when the rotating electrical machine (80) is drive-coupled to an output member (OUT) through an engagement device (95) capable of changing a state between an engaged state for transmitting drive power and a disengaged state for not transmitting drive power, the torque reduction control or the deceleration control be performed when the engagement device (95) is in the disengaged state, and the torque reduction control be performed when the engagement device (95) is in the engaged state, the output member (OUT) being drive-coupled to wheels (W).

Since the torque reduction control is control for reducing the torque of the rotating electrical machine (80), the absolute value of the torque decreases. Therefore, even if ripples occur in the torque, the amplitude thereof decreases. Hence, even if the rotating electrical machine (80) is drive-coupled to the wheels (W), the ripples of the rotating electrical machine (80) transmitted to the wheels (W) are also small and the influence thereof is little. On the other hand, in the deceleration control, torque for decelerating the rotating electrical machine (80) is outputted, and thus, the torque is large compared to the torque reduction control, and accordingly, ripples are also large. Hence, when the rotating electrical machine (80) is drive-coupled to the wheels (W), the torque ripples of the rotating electrical machine (80) are more easily transmitted to the wheels (W) compared to the torque reduction control. Therefore, it is preferred that the inverter control device (20) perform torque reduction control or deceleration control when the engagement device (95) is in a disengaged state, and perform torque reduction control when the engagement device (95) is in an engaged state.

It is preferred that when the rotating electrical machine (80) is drive-coupled to an output member (OUT) being drive-coupled to wheels (W) through an engagement device (95) capable of changing a state between an engaged state for transmitting drive power and a disengaged state for not transmitting drive power, the engagement device (95) be placed in the disengaged state in the turn-off failure state.

When the wheels (W) rotate with the rotating electrical machine (80) drive-coupled to the wheels (W), even if torque reduction control is performed, kinetic energy of the rotating electrical machine (80) may not decrease, and the occurrence of counter-electromotive force may not be able to be reduced, either. In addition, in a state in which a switching element (3) has a turn-off failure, if torque reduction control or deceleration control is performed, then there is a possibility that ripples occur in alternating currents (Iu, Iv, and Iw) and ripples also occur in the torque of the rotating electrical machine (80). When the rotating electrical machine (80) is drive-coupled to the wheels (W), the ripples propagate through the wheels (W), which may affect vehicle ride comfort. Therefore, it is preferred that mechanical power transmission between the rotating electrical machine (80) and the wheels (W) be shut off upon performing torque reduction control or deceleration control in a state in which one of the switching elements (3) included in the inverter (10) has a turn-off failure.

In addition, it is preferred that torque used for the deceleration control be torque that can be outputted in a range in which current flowing through the switching elements (3) other than the switching element (3) having the turn-off failure does not exceed allowable current (Ith) allowed for each of the switching elements (3).

By outputting large torque, it is possible to promptly reduce the rotational speed (co) of the rotating electrical machine (80), but flowing of large current resulting therefrom is not desirable. Therefore, it is preferred that upon deceleration control, too, the control be performed such that current that exceeds the allowable current (Ith) does not flow through the switching elements (3).

In addition, it is preferred that torque used for the deceleration control be torque that can be outputted in a range in which a value of alternating current does not exceed a detectable range of a current sensor that detects the alternating current.

In many cases, the rotating electrical machine (80) is subjected to current feedback control based on deviations between the instruction values of alternating current and actual current values. The actual current values are detected by the alternating-current sensor (12). To accurately perform feedback control, an appropriate dynamic range (detection range) based on resolution is set on the current sensor (12). Alternating current used for fail-safe control such as deceleration control is larger in amplitude than alternating current used upon normal feedback control of the rotating electrical machine (80). If the detection range of the current sensor (12) is set in accordance with amplitude obtained upon fail-safe control, then the accuracy of current feedback control decreases. In deceleration control, in order to promptly reduce torque, it is also possible to perform the control such that larger alternating current than that at normal times flows, but if the alternating current exceeds the dynamic range of the current sensor (12), then controllability decreases. Therefore, it is preferred that the inverter control device (20) perform deceleration control using torque that can be outputted in a range in which the value of alternating current does not exceed a detectable range of the current sensor (12) that detects the alternating current.

In addition, it is preferred that the torque reduction control be control for reducing torque of the rotating electrical machine (80), with continuation of torque control for controlling the rotating electrical machine (80) based on target torque or rotational speed control for controlling the rotating electrical machine (80) based on a target speed.

Even if torque reduction control is performed as fail-safe control, the controllability of the rotating electrical machine (80) can be maintained.

In addition, it is preferred that the inverter control device (20) perform shutdown control for controlling all of the switching elements (3) included in the inverter (10) to an off state, after the torque reduction control or the deceleration control.

When torque reduction control or deceleration control is performed, the rotational speed (w) of the rotating electrical machine (80) decreases. Therefore, it is preferred that after performing torque reduction control or deceleration control, the control mode transition to shutdown control to stop the inverter (10).

In addition, it is preferred that in a state in which a failure different than the turn-off failure has occurred in at least one of the inverter (10) and the rotating electrical machine (80), the inverter control device (20) perform active short-circuit control for bringing all of the switching elements (3) on one of sides including upper-stage-side switching elements (31) and lower-stage-side switching elements (32) included in the inverter (10) into an on state, and bringing all of the switching elements (3) on another side into an off state, or shutdown control for bringing all of the switching elements (3) included in the inverter (10) into an off state, and the inverter control device (20) selectively perform the active short-circuit control or the shutdown control when (a) when overvoltage has occurred in which voltage (Vdc) on a direct-current side of the inverter (10) is greater than or equal to a predefined reference voltage, or (b) when there is a current sensor abnormality in which an abnormality has occurred in a current sensor (12) that detects current flowing through stator coils (8) of the rotating electrical machine (80), the inverter control device (20) perform the shutdown control (c) when there is a rotation sensor abnormality at startup in which an abnormality has occurred in a rotation sensor (13) that detects rotation of the rotating electrical machine (80), at startup of the rotating electrical machine (80), or (d) when there is a boosted voltage abnormality at startup in which an abnormality has occurred in boosted voltage at startup of the rotating electrical machine (80), the boosted voltage being obtained by boosting output voltage of the direct-current power supply (11) and being supplied to the inverter (10), and the inverter control device (20) perform the active short-circuit control (e) when there is a current sensor's broken-wire abnormality in which a break in a wire has occurred between the current sensor (12) and the inverter control device (20), (f) when there is a rotation sensor abnormality in which an abnormality has occurred in the rotation sensor (12), or (g) when there is a boosted voltage abnormality in which an abnormality has occurred in the boosted voltage.

When the inverter (10) does not have a turn-off failure, the inverter control device (20) can appropriately perform active short-circuit control or shutdown control as fail-safe control, according to the state of a failure (abnormality).

The invention claimed is:

1. An inverter control device that controls an inverter connected to a direct-current power supply and connected to an alternating-current rotating electrical machine to convert electric power between direct current and alternating current of a plurality of phases, the inverter control device comprising:

an electronic control unit that is configured to perform, in a state in which one switching element of a plurality of switching elements included in the inverter has a turn-off failure in which the switching element always goes into an off state, torque reduction control for reducing torque of the rotating electrical machine or deceleration control for outputting torque in a reverse direction from a rotation direction of the rotating electrical machine by performing switching control of the plurality of switching elements.

2. The inverter control device according to claim 1, wherein the rotating electrical machine is drive-coupled to an output through an engagement device capable of changing a state between an engaged state for transmitting drive power and a disengaged state for not transmitting drive power, the output member being drive-coupled to wheels, and the electronic control unit is configured to perform the torque reduction control or the deceleration control when the engagement device is in the disengaged state, and the electronic control unit is configured to perform the torque reduction control when the engagement device is in the engaged state.

3. The inverter control device according to claim 2, wherein the engagement device is placed in the disengaged state in the turn-off failure state.

4. The inverter control device according to claim 3, wherein torque used for the deceleration control is torque that can be outputted in a range in which current flowing through the plurality of switching elements other than the switching element having the turn-off failure does not exceed allowable current allowed for each of the plurality of switching elements.

5. The inverter control device according to claim 4, wherein the torque reduction control is control for reducing torque of the rotating electrical machine, with continuation of torque control for controlling the rotating electrical machine based on target torque or rotational speed control for controlling the rotating electrical machine based on a target speed.

6. The inverter control device according to claim 5, wherein the electronic control unit is configured to perform shutdown control for controlling all of the plurality of switching elements included in the inverter to an off state after the torque reduction control or the deceleration control.

7. The inverter control device according to claim 6, wherein the electronic control unit is configured to perform, in a state in which a failure different than the turn-off failure has occurred in at least one of the inverter and the rotating electrical machine, active short-circuit control for bringing all of the plurality of switching elements on one of sides including upper-stage-side switching elements and lower-stage-side switching elements included in the inverter into an on state, and bringing all of the plurality of switching elements on another side into an off state, or shutdown control for bringing all of the plurality of switching elements included in the inverter into an off state, the active short-circuit control or the shutdown control is selectively performed when overvoltage has occurred in which voltage on a direct-current side of the inverter is greater than or equal to a predefined reference voltage, or when there is a current sensor abnormality in which an abnormality has occurred in a current sensor that detects alternating current, the electronic control unit is configured to perform the shutdown control when there is a rotation sensor abnormality at startup in which an abnormality has occurred in a rotation sensor that detects rotation of the rotating electrical machine, at startup of the rotating electrical machine, or when there is a boosted voltage abnormality at startup in which an abnormality has occurred in boosted voltage at startup of the rotating electrical machine, the boosted voltage being obtained by boosting output voltage of the direct-current power supply and being supplied to the inverter, and the electronic control unit is configured to perform the active short-circuit control when there is a current sensor's broken-wire abnormality in which a break in a wire has occurred between the current sensor and the inverter control device, or when there is a rotation sensor abnormality in which an abnormality has occurred in the rotation sensor, or when there is a boosted voltage abnormality in which an abnormality has occurred in the boosted voltage.

8. The inverter control device according to claim 3, wherein torque used for the deceleration control is torque that can be outputted in a range in which a value of alternating current does not exceed a detectable range of a current sensor that detects the alternating current.

9. The inverter control device according to claim 2, wherein torque used for the deceleration control is torque that can be outputted in a range in which current flowing through the plurality of switching elements other than the switching element having the turn-off failure does not exceed allowable current allowed for each of the plurality of switching elements.

10. The inverter control device according to claim 2, wherein the torque reduction control is control for reducing torque of the rotating electrical machine, with continuation of torque control for controlling the rotating electrical machine based on target torque or rotational speed control for controlling the rotating electrical machine based on a target speed.

11. The inverter control device according to claim 2, wherein the electronic control unit is configured to perform shutdown control for controlling all of the plurality of switching elements included in the inverter to an off state after the torque reduction control or the deceleration control.

12. The inverter control device according to claim 2, wherein the electronic control unit is configured to perform, in a state in which a failure different than the turn-off failure has occurred in at least one of the inverter and the rotating electrical machine, active short-circuit control for bringing all of the plurality of switching elements on one of sides including upper-stage-side switching elements and lower-stage-side switching elements included in the inverter into an on state, and bringing all of the plurality of switching elements on another side into an off state, or shutdown control for bringing all of the plurality of switching elements included in the inverter into an off state, the active short-circuit control or the shutdown control is selectively performed when overvoltage has occurred in which voltage on a direct-current side of the inverter is greater than or equal to a predefined reference voltage, or when there is a current sensor abnormality in which an abnormality has occurred in a current sensor that detects alternating current, the electronic control unit is configured to perform the shutdown control when there is a rotation sensor abnormality at startup in which an abnormality has occurred in a rotation sensor that detects rotation of the rotating electrical machine, at startup of the rotating electrical machine, or when there is a boosted voltage abnormality at startup in which an abnormality has occurred in boosted voltage at startup of the rotating electrical machine, the boosted voltage being obtained by boosting output voltage of the direct-current power supply and being supplied to the inverter, and the electronic control unit is configured to perform the active short-circuit control when there is a current sensor's broken-wire abnormality in which a break in a wire has occurred between the current sensor and the inverter control device, or when there is a rotation sensor abnormality in which an abnormality has occurred in the rotation sensor, or when there is a boosted voltage abnormality in which an abnormality has occurred in the boosted voltage.

13. The inverter control device according to claim 1, wherein torque used for the deceleration control is torque that can be outputted in a range in which current flowing through the plurality of switching elements other than the switching element having the turn-off failure does not exceed allowable current allowed for each of the plurality of switching elements.

14. The inverter control device according to claim 13, wherein the torque reduction control is control for reducing torque of the rotating electrical machine, with continuation of torque control for controlling the rotating electrical machine based on target torque or rotational speed control for controlling the rotating electrical machine based on a target speed.

15. The inverter control device according to claim 13, wherein the electronic control unit is configured to perform shutdown control for controlling all of the plurality of switching elements included in the inverter to an off state after the torque reduction control or the deceleration control.

16. The inverter control device according to claim 1, wherein torque used for the deceleration control is torque that can be outputted in a range in which a value of alternating current does not exceed a detectable range of a current sensor that detects the alternating current.

17. The inverter control device according to claim 1, wherein the torque reduction control is control for reducing torque of the rotating electrical machine, with continuation of torque control for controlling the rotating electrical machine based on target torque or rotational speed control for controlling the rotating electrical machine based on a target speed.

18. The inverter control device according to claim 1, wherein the electronic control unit is configured to perform shutdown control for controlling all of the plurality of switching elements included in the inverter to an off state after the torque reduction control or the deceleration control.

19. The inverter control device according to claim 1, wherein the electronic control unit is configured to perform, in a state in which a failure different than the turn-off failure has occurred in at least one of the inverter and the rotating electrical machine, active short-circuit control for bringing all of the plurality of switching elements on one of sides including upper-stage-side switching elements and lower-stage-side switching elements included in the inverter into an on state, and bringing all of the plurality of switching elements on another side into an off state, or shutdown control for bringing all of the plurality of switching elements included in the inverter into an off state, the active short-circuit control or the shutdown control is selectively performed when overvoltage has occurred in which voltage on a direct-current side of the inverter is greater than or equal to a predefined reference voltage, or when there is a current sensor abnormality in which an abnormality has occurred in a current sensor that detects alternating current, the electronic control unit is configured to perform the shutdown control when there is a rotation sensor abnormality at startup in which an abnormality has occurred in a rotation sensor that detects rotation of the rotating electrical machine, at startup of the rotating electrical machine, or when there is a boosted voltage abnormality at startup in which an abnormality has occurred in boosted voltage at startup of the rotating electrical machine, the boosted voltage being obtained by boosting output voltage of the direct-current power supply and being supplied to the inverter, and the electronic control unit is configured to perform the active short-circuit control when there is a current sensor's broken-wire abnormality in which a break in a wire has occurred between the current sensor and the inverter control device, or when there is a rotation sensor abnormality in which an abnormality has occurred in the rotation sensor, or when there is a boosted voltage abnormality in which an abnormality has occurred in the boosted voltage.

20. The inverter control device according to claim 2, wherein torque used for the deceleration control is torque that can be outputted in a range in which a value of alternating current does not exceed a detectable range of a current sensor that detects the alternating current.

* * * * *